(12) United States Patent
Kersh (10) Patent No.: US 9,058,594 B2
(45) Date of Patent: Jun. 16, 2015

(54) STORING AND SHARING PERSONAL INFORMATION OVER THE INTERNET

(75) Inventor: Nigel Kersh, Raanana (IL)

(73) Assignee: Nigel Kersh, Ra'Anana (IL)

( * ) Notice: Subject to any disclaimer, the term of this patent is extended or adjusted under 35 U.S.C. 154(b) by 310 days.

(21) Appl. No.: 13/467,091

(22) Filed: May 9, 2012

(65) Prior Publication Data

US 2012/0290661 A1 Nov. 15, 2012

Related U.S. Application Data

(60) Provisional application No. 61/483,822, filed on May 9, 2011.

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC ... H04L 67/306; G06Q 50/01; G06Q 30/2057
USPC .................................. 709/204–207, 217–219
See application file for complete search history.

(56) References Cited

U.S. PATENT DOCUMENTS

| 8,412,770 | B2* | 4/2013 | Marcucci et al. | 709/204 |
| 8,589,807 | B2* | 11/2013 | Baldwin et al. | 715/753 |
| 2008/0098005 | A1* | 4/2008 | Goradia | 707/10 |
| 2008/0147810 | A1 | 6/2008 | Kumar et al. | |
| 2008/0307320 | A1 | 12/2008 | Payne et al. | |
| 2012/0171654 | A1* | 7/2012 | D'Angelo et al. | 434/322 |

* cited by examiner

*Primary Examiner* — Chirag R Patel (57) ABSTRACT

A system and method for providing a social network computing system having a database of user records of members of the social network where the user records are structured according to topic. Topics are arranged in an interlinked manner in a topic library stored on the database and managed by database manager. Each topic is related to a set of questions relevant to the topic. For each question, a user preferably records a video recording containing a response to the question. The user records may be edited by the owner or viewed by other members of the social network according to permissions.

6 Claims, 8 Drawing Sheets

STORING AND SHARING PERSONAL INFORMATION OVER THE INTERNET

This patent application claims the benefit of U. S. Provisional Patent Application No. 61/483,822, filed May 9, 2011

FIELD AND BACKGROUND OF THE INVENTION

The present invention relates to a storing and sharing personal information over the Internet and, more particularly, to a method and system for sharing in-depth personal information via a social network.

The Internet is awash with social network websites providing users with ways of telling the world more about their members. Sites such as Pacebook™, MySpace™, and LinkedIn™ boast hundreds of millions of users, and membership numbers are growing at an exponential rate. However, one deficiency common to all of these sites is that these social networks, and others like them, really only skim the surface in presenting the network members' personalities. These sites do not enable delving deeply enough into the personalities of their members, nor do they enable searching for members based on the multitude of interests and opinions that form each member's personality.

It would be highly advantageous to have a system and method for both storing and sharing personal information regarding a multitude of interests and where individuals can search for members based on selected interests.

SUMMARY OF THE INVENTION

The present invention is of a method and system for creating, storing, distributing, and accessing personal information over the Internet. In the context of the present disclosure, "personal information" is any information that a person provides about himself or from himself about the world, including (but not limited to) thoughts, views, opinions, experiences, biographical data, knowledge and descriptions. The method is preferably implemented as over the World Wide Web (WWW) on the Internet and functions as follows:

Each member has a personal record stored, which consists of subjective data on any of a number of selectable topics. The data on each topic consist primarily of video responses (recorded by the member) to a series of questions. It is noted that the personal record is a fundamentally wider form of the "profile", prevalent in present social networks, and may amount to a "personality image".

The member creates, or gradually builds up, a personal record by selecting topics, one at a time, from a menu presented by the system, and responding to each of a series of questions presented by the system, using a microphone and web camera. Alternatively, the responses can be typed into the system and "spoken" by a computer-generated avatar. The responses are compiled by the system into the personal record of the user/member in a data base.

Any member of the network (under the usual permission arrangements) may access a record of another member and, upon selecting any of the stored topics, may further select any of the corresponding questions, answers to which have been previously recorded by the observed member, then hear and/or view the recorded response.

The system of the invention uses structures and features found in current systems known as social networks, including for example— association of a group of "friends" with any one subscriber wherein the subscriber controls the rights to access information stored by the subscriber;

stored personal record (also known as profile) for each subscriber which is displayable as one or more Web pages;

cross links between groups through common members.

However, in keeping with the primary object of storing and managing a rich database of personal information and in contra-distinction from currently known social networks, the method and system of the present invention include, inter alia, the following novel characteristics:

(a) A plurality of user records where the personal record of a subscriber can generally include an unlimited amount and variety of personal information. As a fundamental feature of the invention, the personal information is recorded primarily in video format, that is—as a series of video clips in which the subscriber delivers responses to a set of pre-recorded questions orally. Information may also be entered as text and may be supplemented by attached documents, in various formats, which include, for example, text (possibly including Web links), graphics, pictures, audio clips and additional video clips.

(b) The personal information is structured in each record in terms of topics; additionally it is preferably structured, within each topic, as answers to a set of relevant questions. Searches by other persons among personal records may be made in terms of this structure.

(c) The topics are centrally supervised, to form a common thesaurus (or topic library 202), but can be supplemented by subscribers who can add new topics.

(d) The topics are partly and flexibly interlinked, the links being preferably formed and assigned weights according to usage by subscribers and viewers. Physically the system comprises data storage facilities, software residing in one or more servers and application software that is downloadable to subscribers' and viewers' computing devices (such as personal computers, PDAs, mobile communication devices, and mobile computing devices). The software at the server is operational to manage a data base, residing in the storage, and to communicate with subscribers and viewers through the application software. The data base includes the personal records of all the subscribers, the entire collection of topics, with the associated sets of questions and with the accumulated cross links, and the list of groups, with their members' identities and permission levels.

The term "friend" is used herein to refer to a person designated by a user to be a known acquaintance of the user. For example, user A. is a friend of user B, if user B designated user A as a friend (i.e. a "first-degree" friend) and vice versa (i.e. both sides have to confirm friendship). Furthermore, the "second-degree" friends of user B are the friends of the friends of user B. Similarly, the "third-degree" friends of user B are the friends of the friends of the friends of user B.

The term "social network" is used herein to refer to a grouping of individuals that designate certain individuals (and vice-versa) as friends. The term "social-network" is used interchangeably herein to refer to a system that supports a social network and allows users to share information with friends.

According to the present invention there is provided a computer-readable non-transient storage medium 1106 having embedded thereon computer-readable code for managing a plurality of user records 10, the computer-readable code including: (a) program code for enabling a registered user of a social network computing system 200 to edit a user record 10 of the registered user on the social network computing system; (b) program code for enabling the registered user to select a topic segment 20 having a heading topic 24 from a topic library 202, wherein the selected topic segment 20 further includes a set of at least one question sub-segments 30 relevant to the heading topic 24 of the selected topic segment 20; (c) program code for enabling the registered user to select a question sub-segment 30 from the set of at least one question sub-segments 30 including a question 38, wherein the question 38 is relevant to the heading topic 24 of the selected topic segment 20; and (d) program code for enabling the registered user to prepare a message 34 responding to the question 38 of the selected question sub-segment 30, characterised wherein the prepared message 34 is stored in the selected sub-segment 30 of the selected topic segment 20 of the user record 10, and wherein the user record 10 is accessible to other registered users of the social network according to access rights.

According to further features in preferred embodiments the computer-readable code, further includes: (e) program code for enabling the registered user to control the access rights.

According to still further features the selected topic segment 20 further includes a set of topic links 26, adapted to contain links to other topic segments 20 related to the selected topic segment.

According to still further features the topic library 202 is adapted to be supplemented with new topics added by registered users. According to still further features the set of at least one question sub-segments 30 of the selected topic segment 20 is adapted to be supplemented with new questions added by registered users.

According to still further features the code further includes: (e) program code for further enabling registered user to store supplementary data in the selected question sub-segment 30 of the selected topic segment 20 of the personal record 10.

According to still further features the supplementary data includes data elements selected from the group including: a question link file 32 adapted to contain a set of links to related question sub-segments 30 and related supplementary data, a text document, an audio file, and audio/visual file, and an image.

According to still further features the prepared message 34 is in a format selected from the group including: an audio/visual recording, an audio recording, an image, a text-based message.

According to another embodiment there is provided a computing system for a social network including: (a) at least one network server 200 including: (i) a Data Base 230 including a library 204 of user records 10 of user members of the social network and a topic library 202, (ii) a User Communications and Applications Manager (UCAM) 210, and (iii) a Data Base Manager 220, characterised wherein the database manager is configured to manage the libraries and exchange data between the database and the UCAM 210 and wherein the UCAM is operative to communicate, via a network, with a user computing device, and wherein each user record 10 contains personal information data of a user member of the social network to whom the personal information data pertains.

According to further features the at least one network server further includes: (iv) client software configured to be downloaded from at least one network server to the user computing device, and wherein the UCAM is operative to exchange data with the user computing device via the client software.

According to still further features each user record includes: (i) a Profile and General Presentation (PGP) segment 22, configured to include at least a portion of the personal information data of the user member, and (ii) at least one topic segment 20 headed by a topic 24, wherein the heading topic 24 is selected from the topic library 202.

According to still further features the at least one topic segment 20 includes: (i) the heading topic 24, (ii) at least one question sub-segment 30, and (iii) a set of topic links 26.

According to still further features each at least one question sub-segment 30 includes: (i) a question 38 related to the heading topic 24, (ii) a message 34 answering the question 38, (iii) supplementary data 36 related to the question 38 or the message 34, and (iv) a question link file (32) configured to contain a set of links to related questions and related supplementary data.

According to still further features the message 34 and supplementary data 36 are selected from the group of data elements including: an audio/visual recording, an audio recording, an image, a text-based data element and a null element having null data.

According to still further features the heading topic 24 and the question 38 related to the heading topic, are newly added to the computing system by at least one registered user of the computing system.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of an online computer interface for providing and sharing detailed user profiles according to the present invention may be better understood with reference to the drawings and the accompanying description.

Structure

Figure 1:
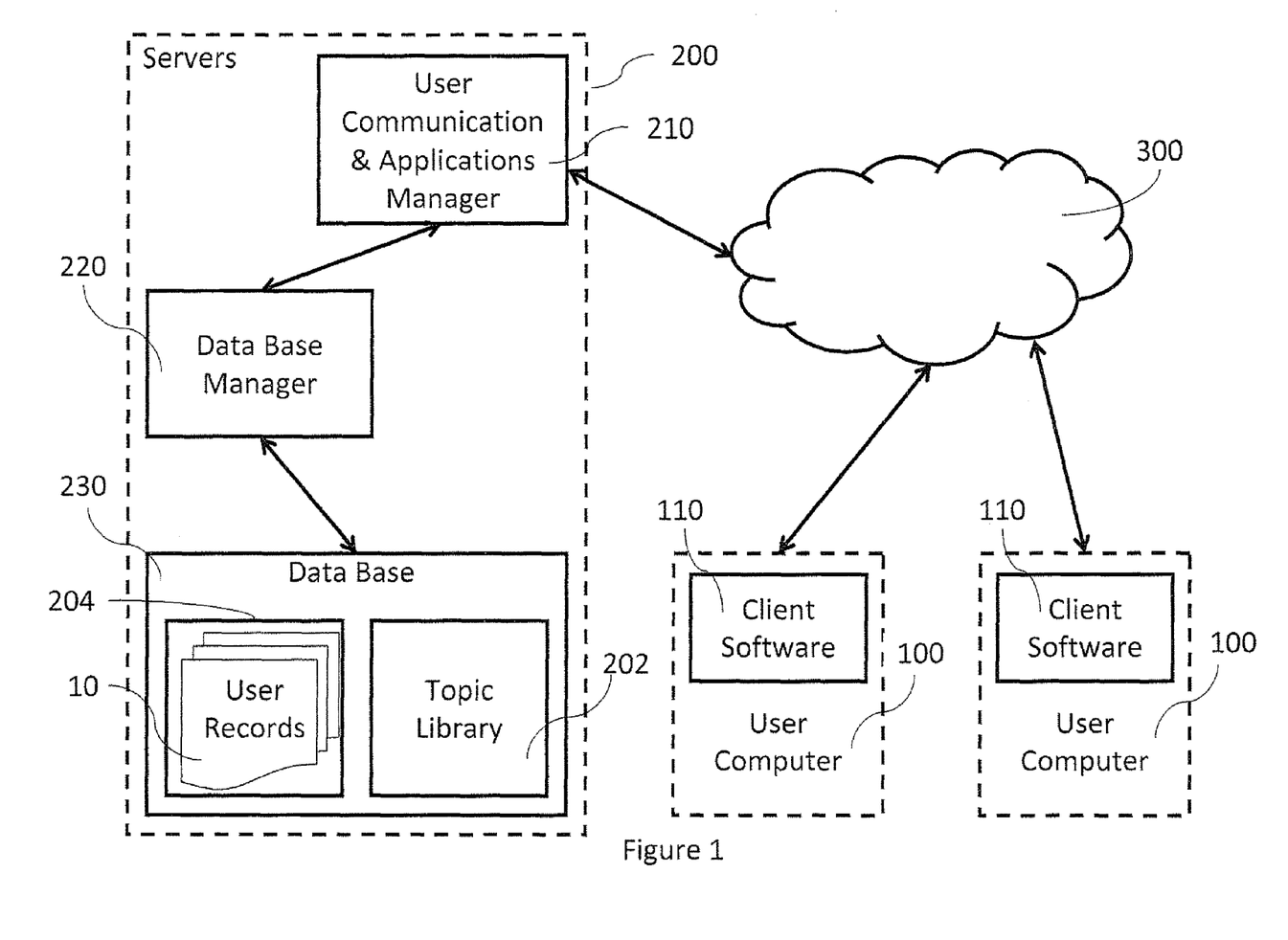
FIG. 1 is an overview of an exemplary system for carrying out an embodiment of the method of the present invention.

Referring now to the drawings, FIG. 1 depicts schematically, in overview, an embodiment of a system for carrying out the method of the invention. The system comprises basically a central software group, installable in whole or in part in one or more computing facilities that function as network servers 200, and a client software 110, installable in any of a plurality of user computers 100. The servers and the user computers are interlinked by a network 300—preferably including the Internet. The term "computer" is to be understood in the widest sense of the word, to include, for example, personal computers, laptop computers, personal digital assistants (PDA, also known as computer tablets) and Internet-enabled cellular telephones. The computer is presumed to include, or have attached thereto, a microphone and a video camera. The client software is preferably based on WWW protocols and is operational within the computer's operating system, with operational access to all the peripheral and user interface facilities and particularly—to the microphone and the video camera.

The central software group basically includes a User Communications and Applications Manager (UCAM) 210 and a Database Manager 220. UCAM 210 is operative to communicate, via network 300, with the Client SW 110 in the various user computers 100—downloading, for example, applications SW and window graphics as needed and exchanging data with the user. The Database Manager 220 maintains a data base 230 within the storage memory of the respective server 200, or possibly within another server 200, and is operative to exchange data between the database and the UCAM 210 (which data are, in turn, exchanged with the users through their client SW). In an alternative, and less preferred, embodiment of the invention, users do not download and install any client SW 110, but rather access the system via an online interface where all the profile information and files are uploaded directly to the server or recorded directly onto the network servers. A user computer 100 includes standard browsing software allowing a user to access a system portal via network 300 an interact directly with UCAM 210 and data base manager 220 in order to perform at least all of the aforementioned activities. In this embodiment, the required bandwidth and connection speed are quite significant, making this embodiment less preferable in general, while still being feasible (especially as bandwidths and connection speeds are constantly growing at an exponential rate).

Figure 8:
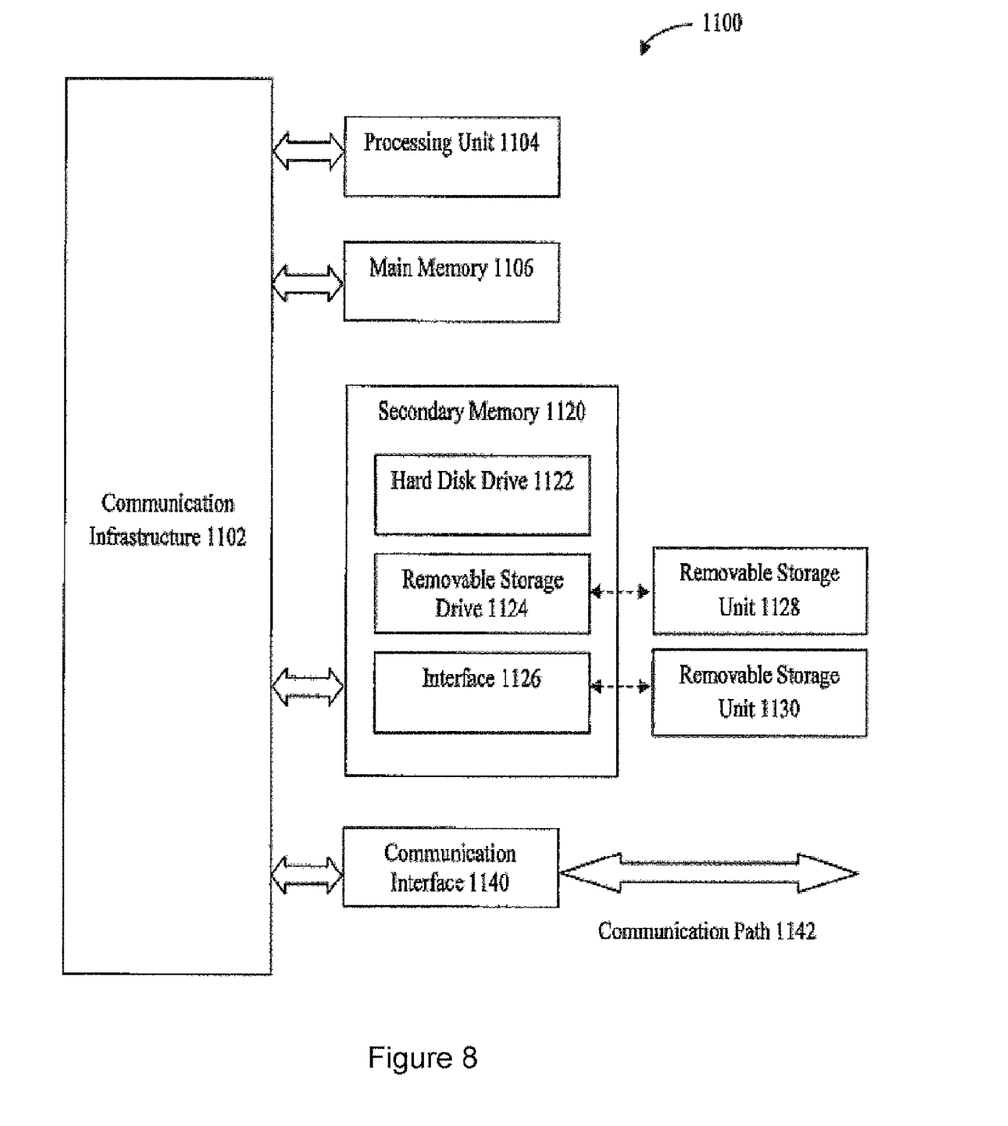
FIG. 8 is a schematic depiction of an exemplary computing system upon which the system of the immediate invention may be implemented.

In the embodiment of the invention depicted in FIG. 1, the network servers 200 include various software applications, components and systems. Network servers 200 may be implemented on any processor-based computing system. An example of such a computer system 1100 is depicted in FIG. 8. Each network server 200 may be implemented on a single or several computing systems such as or similar to computer system 1100 described below. Data base 230 may be stored on a single storage medium (e.g. such as secondary memory 1120) or multiple storage mediums either collocated or distributed over a plurality of interconnected storage mediums.

Database 230 basically includes two libraries. The one library 204 consists of the personal user records 10 of all registered users and the other library 202—of all the topics defined in the system, with their linking data, all of which will be explained in detail below.

Not shown in FIG. 1, yet obviously included in the software are those modules that are operative to maintain the social-network functions of the system. These are known from prior art and will not be further described here.

Figure 2:
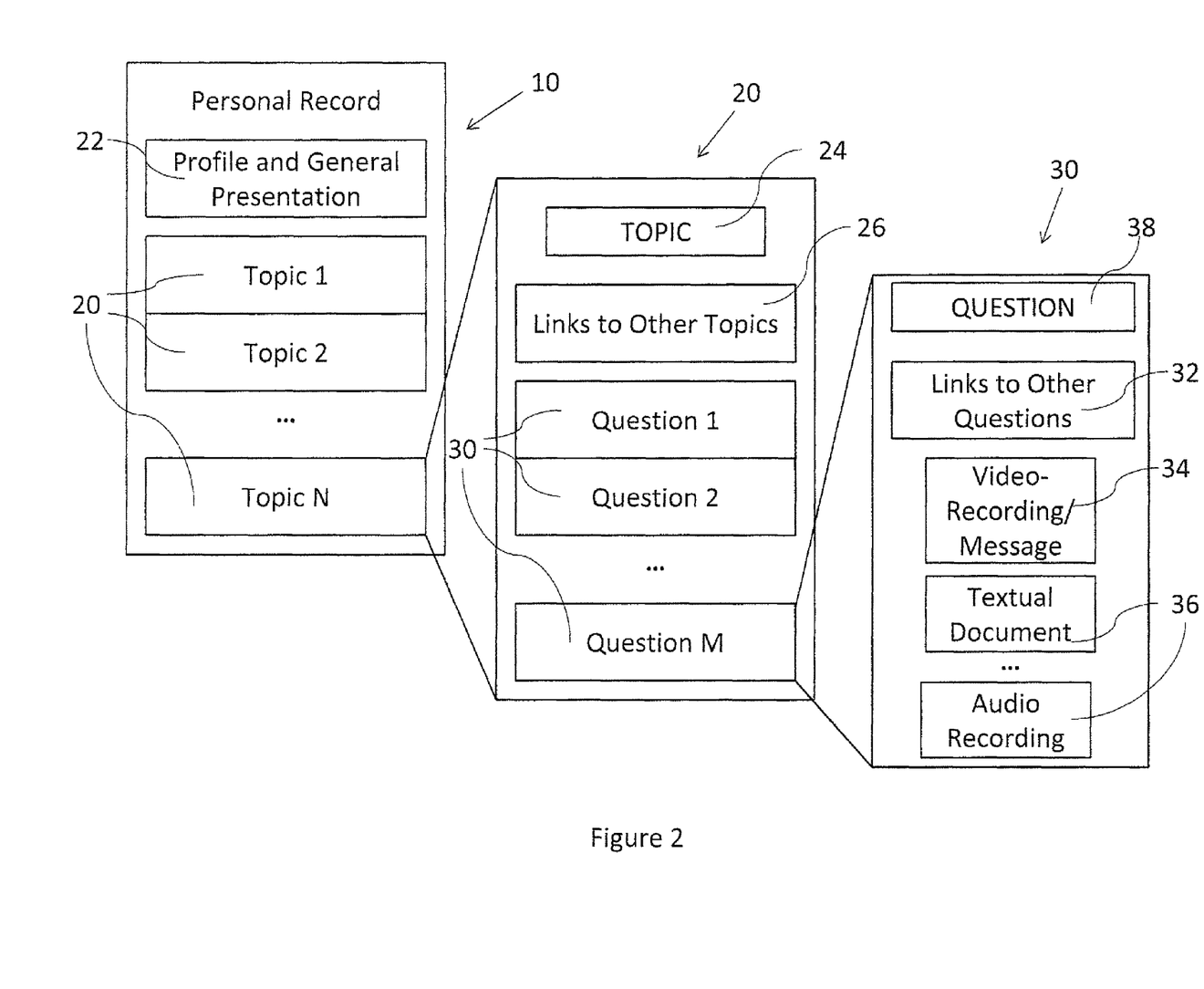
FIG. 2 is a schematic depiction of the structure of an exemplary subscriber personal record according to an embodiment of the method of the present invention.

FIG. 2 is a schematic depiction of the structure of an exemplary subscriber personal record 10 according to an embodiment of the method of the present invention. Record 10 is structured, generally, by topic. That is to say that the personal data are divided into topic segments 20, each revolving around, and headed by, a certain topic 24. A record 10 may include any number of topic segments 20 (N topics in the illustration). Furthermore, each record 10 includes a Profile and General Presentation (PGP) section 22, which contains at least a portion of the user profile/data, i.e. basic personal information data about the user member of the social network to whom the personal information data pertains, some general personal presentation and at least relevant group associations. PGP section 22 may contain more or less information depending on the specific configuration generally decided by system preferences and/or user selected preferences.

As further illustrated in FIG. 2, a typical topic segment 20 is divided into sub-segments 30, where each associated with a distinct question 38. A segment 20 may contain any number of questions/sub-segments (M sub-segments in the illustration).

Additionally each segment 20 includes the name of the topic 24 and, optionally, links 26 to other, associated, topics (as explained below). The set of topic links 26 to related topics may have one link, a plurality of links or may even be empty.

Finally, each question sub-segment 30 includes, beside the question itself, at least one personal video recording/Message 34, in which the user answers the respective question, whereby the user may, for example, offer related personal information and/or expound on personal views on the topic as freely emanating from the question. Additionally, sub-segment 30 may include various other pieces/elements of supplementary data 36 as well as a set of links which link to other, related questions or foreign pieces of data (e.g. audio files, text files, images etc.). The set of links are contained in a question link file 32. Question link file 32 may be empty of links in some sub-segments 30. Data elements or pieces 36 may for example be a text-based document, and/or an audio file and/or a video file and/or an image or a plurality thereof. The audio and/or visual files may belong or pertain to the user (i.e. carry the user's voice and/or image) or belong and/or pertain to another or other individuals (presumably linked in some way to the original user). Generally the files are prerecorded, although, in some embodiments, the links may connect to live audio/video streams.

In some embodiments of the invention, at least a portion of question sub-segments 30 may not include a personal video recording 34 but rather a written (i.e. text based) response or an audio only response or an image-as-a-response or any combination of the above. For example, to the question of "What is your favorite flower?" the user may select an image of a protea (South African national flower) instead of creating a video clip or audio clip.

Figure 3A:
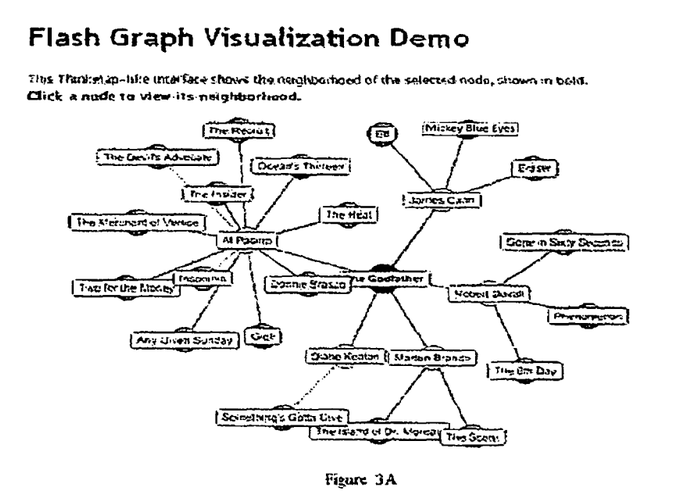
FIG. 3A is a structured on-screen representation of a portion of the topics, as maintained in a central database according to the present invention, including cross links.
Figure 3B:
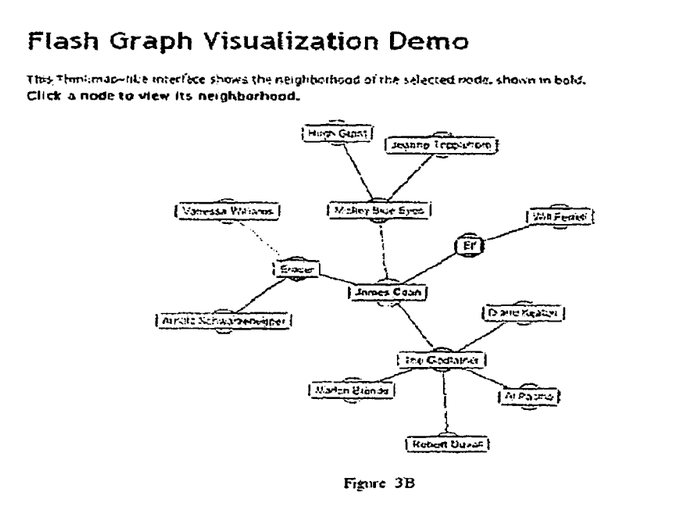
FIG. 3B is an on-screen representation, similar to that of FIG. 3A, of a related portion of the topics database.

Topics library 202 (FIG. 1) is a centrally maintained universal list of topics, from which the topics for any one user record may be drawn, and thus serves as a thesaurus. The list may be structured in any of several useful ways, including, for example, a hierarchical (tree) structure and a net of relational cross links. FIG. 3A illustrates an exemplary graphical representation of a portion of topics library 202 in a relational cross links structure, as may be viewed by a user. The particular portion is denoted in this representation by a bold label on the central node (e.g. "The Godfather"). FIG. 3B illustrates a similar representation of a different portion of topics library 202 that partially overlaps that of FIG. 3A, denoted by another node (here boldly labeled by "James Caan") directly linked to the former one. Associated with each such structure there may be a suitable search scheme, by which a user may arrive at desired topics.

The list, as well as the structural parameters (e.g. hierarchical or relational links etc.), may be compiled authoritatively—possibly in a distributed authority fashion (such as in Wikipedia™)—or may be built up from actual usage by users, where the users are allowed to propose topics of their own choosing. In the latter case, dynamic statistical weighting may be applied in order to determine the resulting structure. The structure of topics library 202, and the parameters thereof, affect the manner in which the topics may be searched—both in compiling a personal user record 10 and in searching for other records. It is noted that the ability to search for personal records based on topics is an optional, yet novel, feature of the present invention.

Associated with each topic in library 202 there are a plurality of questions. These questions may be generic (such as "what is your view on the topic?" or "what has been your experience, related to the topic?"), selectable from a common list, or may be specific to the topic (or to a group of related topics). In the latter case, the questions may be authored and maintained in a manner similar to that described above for the topics themselves. Additionally, the questions for each topic may be given weights according to the frequency of their usage; the weighs determine the order in which questions are presented to the user—both in compiling a personal record 10 and in searching within other records.

Operation

The method of the present invention will now be explained by way of describing the operation of a typical embodiment of the system as presented above. It is understood that while indicative of the preferred method of operation, the method detailed below is not limited to the described embodiment alone. The operation is carried out by the system through the cooperation of all the components mentioned.

Not discussed, but understood to be included, are functions that relate to the social-network aspects of the system, including, for example, procedures for managing group membership and for handling access permissions (except for particular functions, to be discussed below), as well as functions related to site- and service registration.

Figure 7:
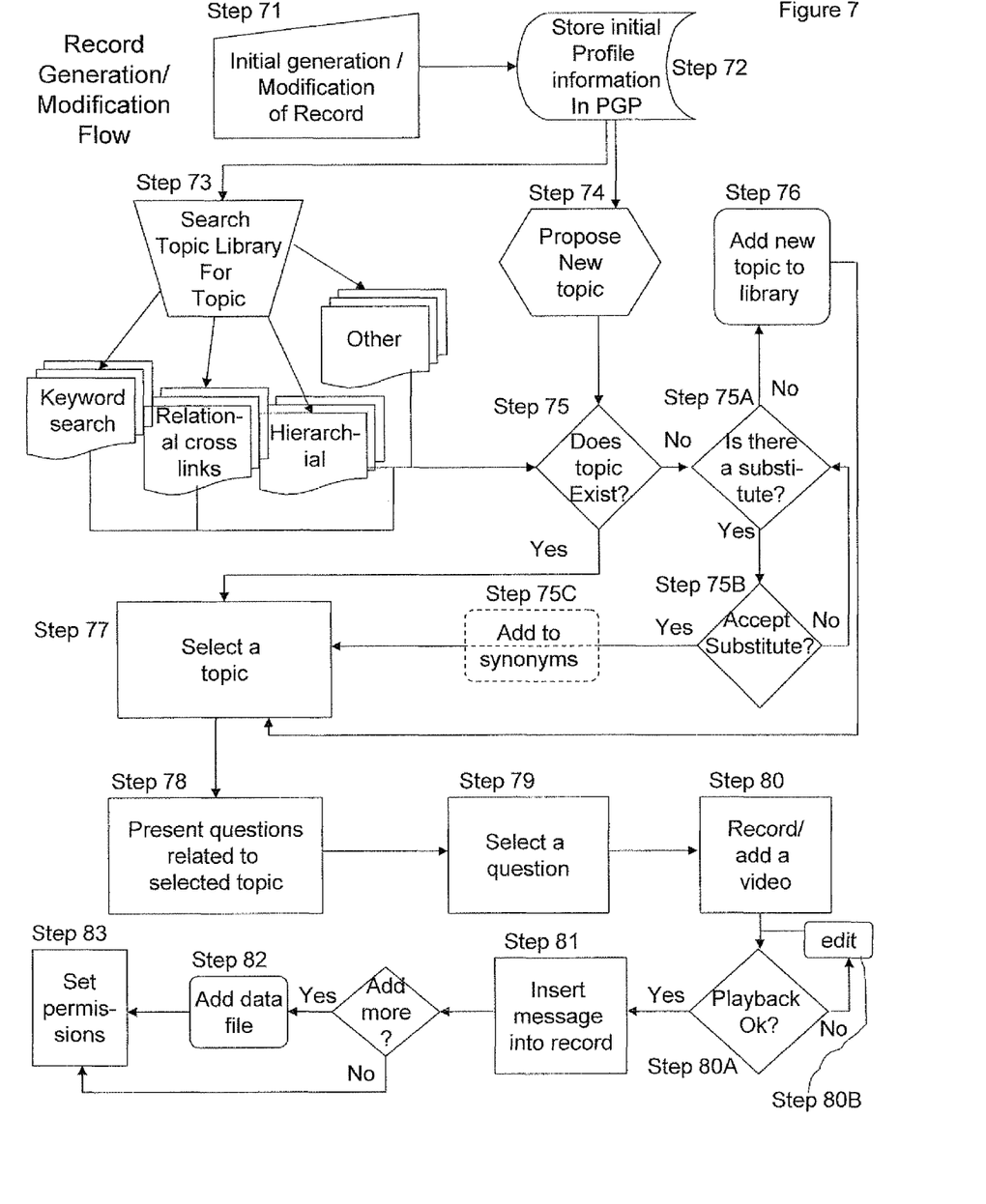
FIG. 7 is a flow diagram detailing the steps of the record Generation/Modification mode.

From the point-of-view of a user, using a computer in the usual manner, wherein the user views and interacts with a screen display, operation proceeds mainly in two modes: Record Generation/Modification mode and Searching/Reading mode. FIG. 7 is a flow diagram detailing the steps of the record generation/modification mode. For the Record Generation/Modification mode the user is first presented with a web page (simply referred to herein as a 'page') that shows a summary of the current personal record (including null in the case of a new user). The user can select an item, such as the general profile, for modification or can choose to add an item, such as a new topic or a new question; deletions are also possible.

Figure 4A:
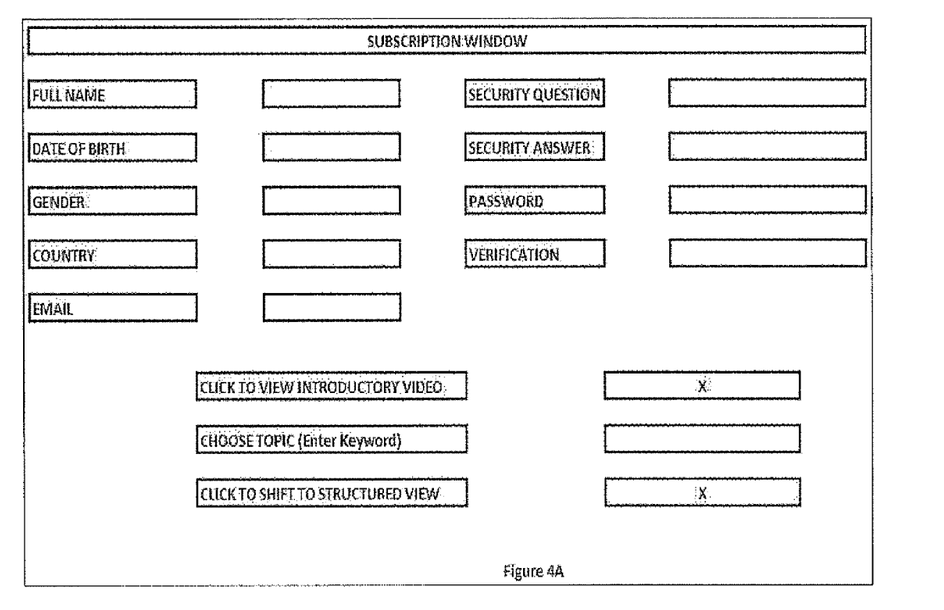
FIG. 4A is a representation of an envisaged typical webpage display for entering information into a personal record.

Step 71 of the process detailed in FIG. 7 includes generating a personal record 10 by providing personal information data to the system using a standardized information page, e.g. such as depicted in FIG. 4A. The user enters various personal information data, possibly including a picture and a personally recorded audio- and/or video message. The latter may serve to convey a general view of the personality, opinions and interests of the user. Alternatively, for an existing record, the first step is to modify the personal record by editing (adding, changing or deleting) the existing personal information data in a similar manner.

In Step 72, the entries are stored in the POP section 22 of personal record 10 (FIG. 2). This information is intended to be viewed and/or listened to by other users as described below.

Figure 5A:
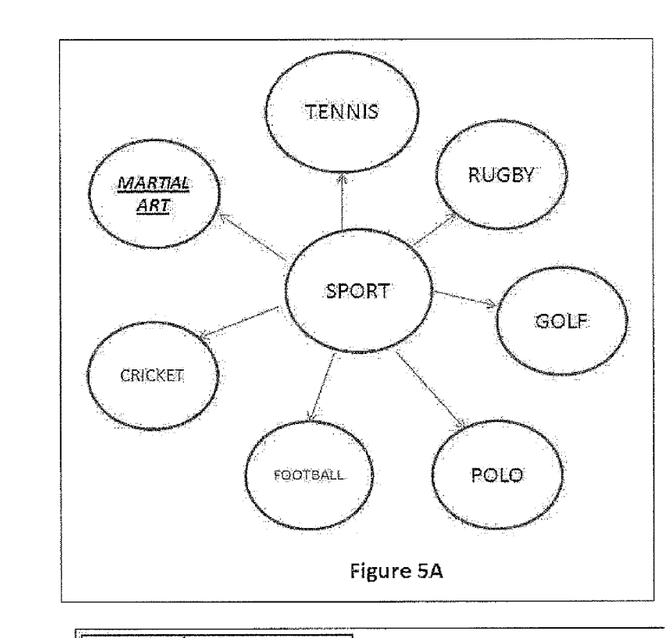
FIG. 5A-5B depict exemplary on-screen, mutually-related representations of hierarchically structured topics at two levels.
Figure 5B:
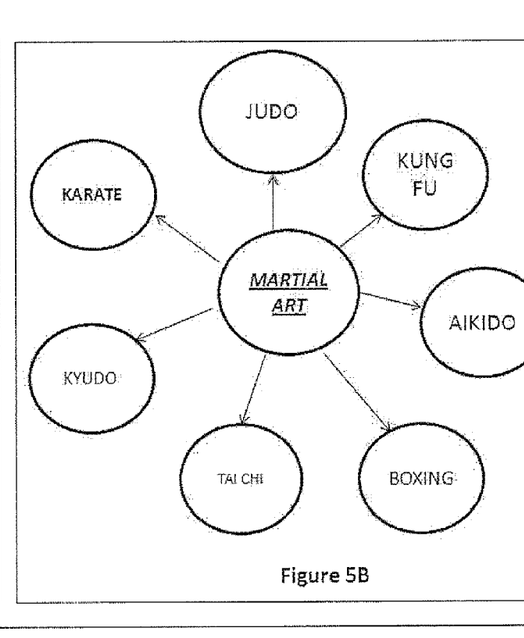

A user can search for a topic 24 in topic library 202 or, if the user cannot find the desired topic, the user can add a topic 24 to the personal record. In Step 73, the user is presented with an interactive search facility (preferably powered by programming residing on database manager 220 which is embodied on a computer-readable storage medium (e.g. 1106 of FIG. 8) having embedded thereon computer-readable code containing computer-readable instructions that can be stored on a computer-readable medium and implemented by a processor-based computing system), whereby a user can search for a topic of interest from among the topics stored in the central topics library 202. The search may be conducted in terms of keywords and/or in terms of the internal structure of the library—for example, along relational cross links or along hierarchical lines (whatever the structure may be). In the case of relational cross links there may appear a presentation of a portion of the topics such as shown in FIG. 3A and the user may click a topic node to shift the presented portion, as appearing for example in FIG. 3B. In the case of a hierarchical structure, the search may be conducted through a series of graphical topics presentations, at progressively deeper hierarchical levels. FIGS. 5A-5B are exemplary depictions of on-screen mutually-related representations of hierarchically structured topics at two levels. Two exemplary consecutive levels are respectively shown, in FIGS. 5A (where "martial arts" is shown as subordinate to "sport") and 5B (where "martial arts" is shown with topics subordinate thereto). Other search methods known in the art may likewise be applied to library 202.

Optionally, in Step 74 the user may propose a new topic 24 to be added to topic library 202. A topic can be added to the library by invoking a procedure residing in the data-base manager 220 (in FIG. 1).

Step 75: If the proposed or searched topic exists then the existing topic is selected in Step 77. If the topic does not exist, then:
  in some embodiments of the invention the proposed topic will be added to library 202 in Step 76 (i.e. skip Step 75A).
  in other embodiments of the invention, database manager 220 includes an intelligent program that, inter alia, checks the closeness of the proposed topic to any of the existing topics. The program may be a rule-based program, may include artificial intelligence, may be supervised by a human administrator, may include open-source based programming, may have open-source rule-based programming, may have any combination of the aforementioned or other "programmed intelligence" as is known in the art. In step 75A, the system checks for closeness of the proposed topic to existing topics. In case of closeness to an existing topic, the system will suggest the close topic as a substitute in Step 75B. Should the user refuse the suggested substitution, then go to Step 75A. If the user accepts the suggestion then the proposed substitute topic is added to the profile in Step 77. In some embodiments, the initially proposed topic is added as a synonym to the suggested/substitute topic.

In Step 77 the proposed topic—whether searched for by the user, newly added by the user or substituted by the system—is selected.

Figure 4B:
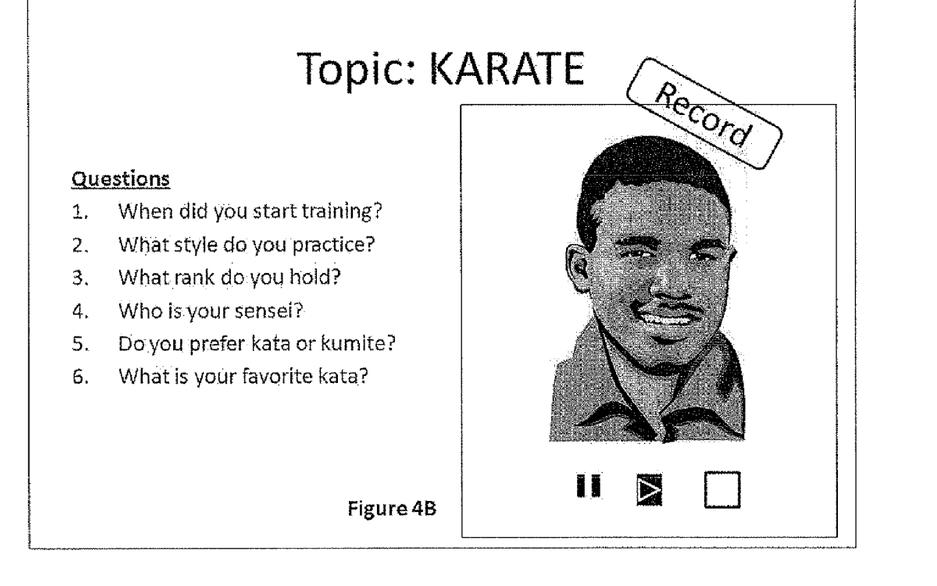
FIG. 4B is a representation of an envisaged typical webpage display for selecting and answering questions on a selected topic.

In Step 78, once a topic has been selected—either via a search for a new topic or from among existing topics in the personal record—a list of questions, associated with that topic, is presented, as shown in the example of FIG. 4B. If the list is very long, it may be presented in some predefined order, such as alphabetical or according to popularity. The latter is a parameter that may be compiled centrally, based on frequency of use of that question—by record generators and/or by record readers.

In Step 79 a question is selected either from an existing list of questions related to the selected topic or wherein the selected question is a new question.

In Step 80, when a question has been selected, the user is invited to record a video message (or other type of message) that addresses the question. Alternatively, the user may insert a prerecorded message. The message may be played back for checking (step 80A) and, optionally, for editing (step 80B).

Once approved by the user. The message is inserted into the record, in Step 81, as Video Recording/Message 34, within the sub-segment 30 associated with the selected question of the topic segment 20 belonging to the current topic 24 (FIG. 2).

Additionally, the user may be invited, in Step 82, to insert other types of data associated with the question, such as text—to form a textual document 36 within the sub-segment—and links to other documents, as well as links to other questions on the topic (where pertinent additional information may be found). The set of links to other questions forms a file 32 in the sub-segment. Of course, every file in the record may be deleted and/or replaced by the owner of the record.

It is noted that the invention conceives the video recordings to be the primary means and mode for the user to present his views, knowledge and experiences with respect to the various topics and thus, in effect—his personality. However, the record generation process will allow entering the information (i.e. the primary answer to any question) also in other modes, such as pure audio, text, images, etc. (as discussed above).

Finally, in Step 83, the record-generating user is given the means to control the access rights of other users to his personal record—preferably at various levels. Generally, full access is allowed for "friends" or "group members", as these terms apply to social networks. However, access may differentiate between viewing, on the one hand, just the profile and general presentation, possibly also the list of included topics, and, on the other hand, the full record, which includes all the responses to all the topics. In some configurations finer differentiation may be enabled, wherein, for example, access rights may be set for each topic or perhaps even for each question. The various access rights may be granted differentially to users within and without the group, wherein, for example outside users may view the profile only, while group members may view the entire record. Optionally, access to certain topics may be granted by the record owner only to individuals upon direct permission.

Having discussed the essence of the Record Generation/Modification mode, the Searching/Reading mode of operation will now be described. Subject to the access rights set by their owners, personal records are searchable and viewable by other users as follows:

Information seeking by a user (to be termed a "viewer" hereinafter, in order to distinguish this type of user from the target user, or subscriber, whose record is being sought) is preferably characterized in terms of two basic foci, one being a particular (target-) subscriber and the other—a topic. The objective of the subscriber-focused approach is to find out information about the target subscriber and his personality (including topics of interest and what the target user has to say about them). On the other hand, the object of the topic focused approach is to find out, firstly, which users have an interest in a particular topic and, secondly, what these individuals have to offer on the topic.

Figure 5C:
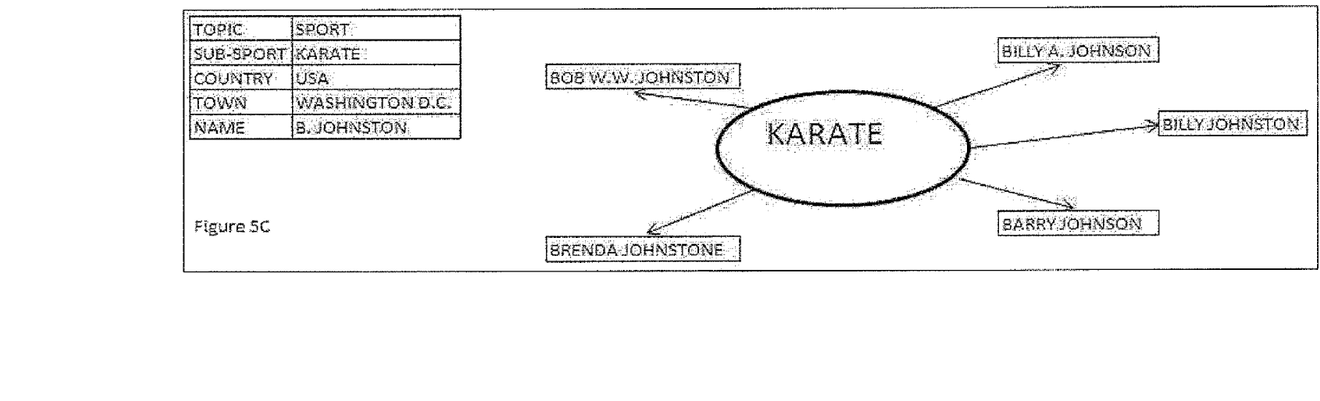
FIG. 5C depicts an exemplary on-screen representation of a list of subscribers associated with a topic.

For the first objective, the viewer is given the usual means of searching for the target subscriber, within a particular group or without, and then negotiating for access to the record of the target user. For the second objective, the viewer is given means of searching for topics of interest. The search is conducted on the topics library 202 (FIG. 1) and is generally similar to that described above with respect to the record generator. In the Searching/Reading mode, the interface may, in some embodiments of the invention, display information to the viewer using representations (e.g. web page views) similar to those depicted in FIGS. 5A and 5B. Once the topic has been identified, the viewer is presented with a list of subscribers that have the topic included in their respective records, as illustrated for example in FIG. 5C. FIG. 5C depicts an exemplary on-screen representation of a list of subscribers associated with a topic. In some embodiments, the group is further limited by a limiting element—e.g. by means of a definable filter (as also illustrated in FIG. 5C). For example, in FIG. 5, the topic is "sports". A first filter is the sub-sport "karate". The next means to limit the search is by requesting only those users within the USA, and furthermore, only within Washington D.C. who have "karate" as a topic of interest. The final limitation is the filter limiting the group only to user with the family name of Johnston and a first initial "B". The resulting, significantly limited, group is displayed on-screen to the viewer. Of course the depicted representation is merely exemplary and forms of presentation, as known to those skilled in the art, are considered within the scope of the invention.

In any case, the viewer may click on the name or the icon of any or each of the listed subscribers, in order to access the personal record of the subscriber, subject to the granted permission levels. Data to be presented is thereafter drawn from the record 10 of the selected subscriber, which is stored in the central data base 230 (FIG. 1).

Figure 6A:
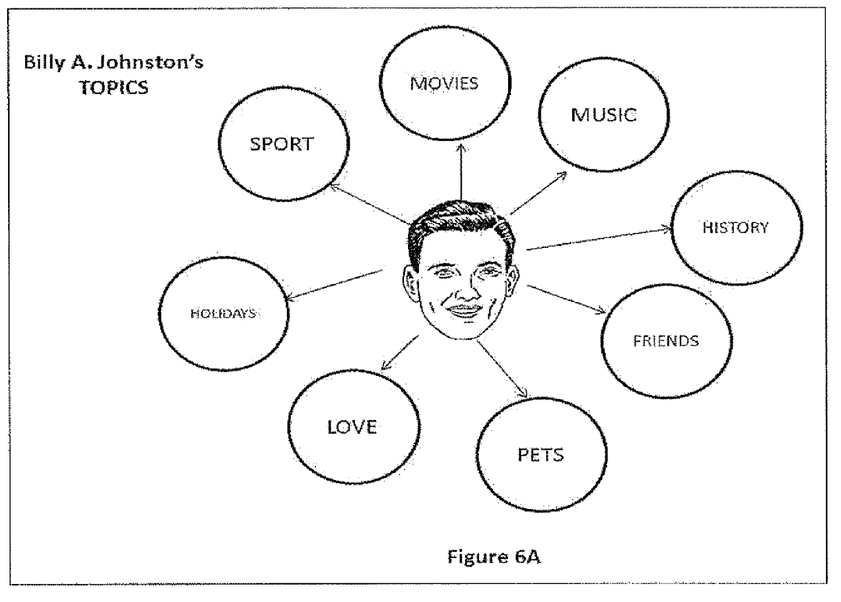
FIG. 6A is a representation of an exemplary typical webpage display for viewing a target subscriber personal record.

If and when access to a subscriber record—at least at the first level—is attained by a viewer, the viewer may call for a display of all the topics included (and accessible) in the personal record. Typically, a viewer views an introductory page, such as shown, for example, in FIG. 6A. FIG. 6A is a representation of an exemplary typical web-page display for viewing a target subscriber personal record. In some embodiments, the profile page includes a subscriber profile and a list of topics, from which the viewer may further select a topic of interest. In the case of a topic-focused search, the topic may appear directly on the page. If the number of topics associated with a subscriber is large, the list of topics may be structured hierarchically or cross-linked relationally. In either instance, the selection of a topic of interest then proceeds accordingly in a series of screens. Thus, for example, in the specific ease illustrated by FIG. 6A, clicking on "Sport" opens a similar screen, with corresponding subtopics (not shown). One of these subtopics may be "Karate". If the number of subtopics is very large, an intermediate level screen (not shown) may appear first, which includes, for example, the intermediate subtopic "Martial arts".

Figure 6B:
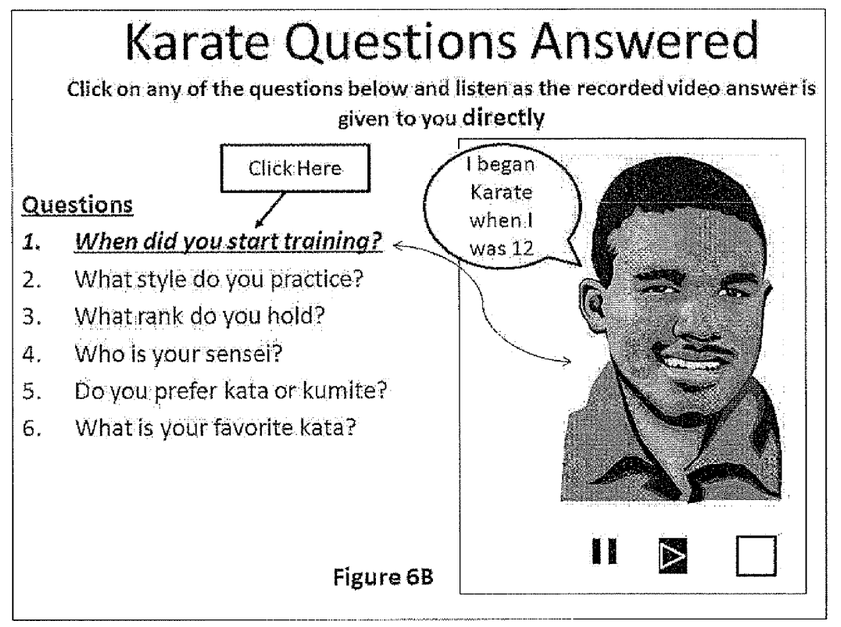
FIG. 6B is a representation of an exemplary typical web page displayed on a subscriber screen that provides recorded answers of a target subscriber to specific questions.

Clicking on the finally selected topic or subtopic leads to a page, such as shown for example in FIG. 6B, that lists the pertinent questions. FIG. 6B is a representation of an exemplary typical web page displayed on subscriber screen that provides recorded answers of a target subscriber to specific questions. Clicking on a question triggers activation of the subscriber response to the question—e.g. a prerecorded video message (also as illustrated in FIG. 6B). The subscriber response to the selected question may further include additional information and/or links to files stored in the segment of the record dealing with the selected question. Additionally or alternatively links to other, related, questions, may further be included on the response page. Any or each of the links may be clicked in order to link to further responses.

Depending on the access rights, the viewer may subsequently choose another topic from the same subscriber record and proceed as before. In the case of a topic-focused search, the viewer may switch to another subscriber associated with the topic of interest and proceed as previously described.

FIG. 8 is a schematic depiction of an exemplary computing system upon which the system of the immediate invention may be embodied. Referring now to FIG. 8, the figure depicts computer system 1100 which includes a processing unit 1104 that includes one or more processors. Processor unit 1104 is connected to a communication infrastructure 1102, which may comprise, for example, a bus or a network.

Computer system 1100 also includes a main memory 1106, preferably random access memory (RAM), and may also include a secondary memory 1120. Secondary memory 1120 may include, for example, non-volatile memory such as a hard disk drive 1122, a removable storage drive 1124, and/or a memory stick. Removable storage drive 1124 may comprise a floppy disk drive, a magnetic tape drive, an optical disk drive, a flash memory, or the like. Removable storage drive 1124 reads from and/or writes to a removable storage unit 1128 in a well-known manner. Removable storage unit 1128 may comprise a floppy disk, magnetic tape, optical disk, or the like, which is read by and written to by removable storage drive 1124. As will be appreciated by persons skilled in the relevant art(s), removable storage unit 1128 includes a computer usable storage medium having stored therein computer software and/or data.

In alternative implementations, secondary memory 1120 may include other similar means for allowing computer programs or other instructions to be loaded into computer system 1100. Such means may include, for example, a removable storage unit 1130 and an interface 1126. Examples of such means may include a program cartridge and cartridge interface (such as that found in video game devices), a removable memory chip (such as an EPROM, or PROM) and associated socket, and other removable storage units 1130 and interfaces 1126 which allow software and data to be transferred from the removable storage unit 1130 to computer system 1100.

Computer system 1100 may also include a communication interface 1140. Communication interface 1140 allows software and data to be transferred between computer system 1100 and external devices. Examples of communication interface 1140 may include a modem, a network interface (such as an Ethernet card), a communications port, a PCM-CIA slot and card, or the like. Software and data transferred via communication interface 1140 are in the form of signals which may be electronic, electromagnetic, optical, or other signals capable of being received by communication interface 1140. These signals are provided to communication interface 1140 via a communication path 1142. Communications path 1142 carries signals and may be implemented using wire or cable, fiber optics, a phone line, a cellular phone link, an RF link and other communications channels.

As used herein, the terms "computer program medium" and "computer readable medium" are used to generally refer to non-volatile media such as removable storage unit 1128, removable storage unit 1130 and a hard disk installed in hard disk drive 1122. Computer program medium and computer readable medium can also refer to memories, such as main memory 1106 and secondary memory 1120, which can be semiconductor devices (e.g., DRAMS, etc.). Computer-readable non-transient storage medium is adapted to have embedded thereon computer-readable code. These computer program products are means for providing software to computer system 1100.

Computer programs (also called computer control logic, programming logic, or logic) are stored in main memory 1106 and/or secondary memory 1120. Computer programs may also be received via communication interface 1140. Such computer programs, when executed, enable the computer system 1100 to implement features of the present invention as discussed herein. Accordingly, such computer programs represent controllers of the computer system 1100. Where the invention is implemented using software, the software may be stored in a computer program product and loaded into computer system 1100 using removable storage drive 1124, interface 1126, or communication interface 1140.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computing system for a social network comprising: (a) at least one network server including:
    (i) a Data Base including a library of user records of user members of the social network and a topic library,
    (ii) a User Communications and Applications Manager (UCAM), and
    (iii) a database manager, wherein said database manager is configured to manage said libraries and exchange data between said database and said UCAM, and wherein said UCAM is operative to communicate, via a network, with a user computing device, and wherein each said user record contains personal information data of a said user member of the social network to whom said personal information data pertains,
    wherein said at least one network server further includes:
    (iv) client software, said client software configured to be downloaded from said at least one network server to said user computing device, and wherein said UCAM is operative to exchange data with said user computing device via said client software,
    wherein each said user record includes: (i) a Profile and General Presentation (PGP) segment, configured to include at least a portion of said personal information data of said user member, and (ii) at least one topic segment headed by a topic, wherein said heading topic is selected from said topic library,
    wherein said at least one topic segment includes: (i) said heading topic, (ii) at least one question sub-segment, and (iii) a set of topic links, wherein each said at least one question sub-segment includes: (i) a question related to said heading topic, (ii) a message answering said question, (iii) supplementary data related to said question or said message, and (iv) a question link file configured to contain a set of links to related said questions and related said supplementary data, wherein said question related to said heading topic newly added to the computing system by at least one said registered user of the computing system,
wherein the registered users share and search for personal information of other said user members in the same social network based on a multitude of interests.

2. The computing system of claim 1, wherein said message is selected from the group of data elements including: an audio/visual recording, and audio recording, an image, a text-based data element and a null element having null data.

3. The computing system of claim 1, wherein said supplementary data is selected from the group of data elements including: an audio/visual recording, an audio recording, an image, a text-based data element and a null element having null data.

4. A non-transitory computer-readable storage medium for causing a processor to execute the steps of:
   storing a library of user records containing personal information of registered user of a plurality of registered members of a social network and a topic library;
   transmitting user records to a user computer device;
   downloading client software to said user computer device;
   exchanging data with said user computing device via said client software;
   wherein each said user record includes: (i) a Profile and General Presentation (PGP) segment, configured to include at least a portion of said personal information data of said user member, and (ii) at least one topic segment headed by a topic, wherein said at least one topic segment includes: (i) said heading topic, (ii) at least one question sub-segment, and (iii) a set of topic links, wherein each said at least one question sub-segment includes: (i) a question related to said heading topic, (ii) a message answering said question, (iii) supplementary data related to said question or said message, and (iv) a question link file configured to contain a set of links to related said questions and related said supplementary data,
   receiving a newly added topic by at least one said registered user of the computing system,
   receiving a selection of said heading topic from said topic library;
   receiving a search query for personal information by the registered user based on a multitude of interests,
   and receiving and processing the search query for personal information in the same social network of other said user members based on the multitude of interests.

5. The medium of claim 4, further comprising: wherein said message is selected from the group of data elements including: an audio/visual recording, and audio recording, an image, a text-based data element and a null element having null data.

6. The medium of claim 4, further comprising: wherein said supplementary data is selected from the group of data elements including: an audio/visual recording, an audio recording, an image, a text-based data element and a null element having null data.

\* \* \* \* \*